United States Patent [19]

Rokey

[11] Patent Number: 5,480,673
[45] Date of Patent: Jan. 2, 1996

[54] EXTRUDED HIGH SOLUBLE PROTEIN ANIMAL FEED AND METHOD OF PREPARING SAME

[75] Inventor: Galen J. Rokey, Sabetha, Kans.

[73] Assignee: Wenger Manufacturing, Inc., Sabetha, Kans.

[21] Appl. No.: 329,070

[22] Filed: Oct. 25, 1994

[51] Int. Cl.⁶ .................. A23K 1/00; A23P 1/12
[52] U.S. Cl. .............. 426/635; 426/2; 426/516; 426/549; 426/656; 426/661
[58] Field of Search .................. 426/635, 516, 426/656, 661, 549, 2

[56] References Cited

U.S. PATENT DOCUMENTS

| | | | |
|---|---|---|---|
| 3,642,489 | 2/1972 | Bartley et al. | 99/2 R |
| 4,284,652 | 8/1981 | Christensen | 426/72 |
| 4,752,139 | 6/1988 | Hauck | 366/298 |
| 4,976,973 | 12/1990 | Shirakawa et al. | 426/7 |
| 5,045,339 | 9/1991 | Ducharme | 426/641 |

*Primary Examiner*—Donald E. Czaja
*Assistant Examiner*—Choon P. Koh
*Attorney, Agent, or Firm*—Hovey, Williams, Timmons & Collins

[57] ABSTRACT

An extrusion process for the production of animal feeds having high soluble protein contents is provided wherein respective starch-bearing and proteinaceous ingredient fractions are differentially processed so as to obtain an extruded final product containing soluble protein. In the process, a starch-bearing fraction is preferably preconditioned and introduced into an extruder; a proteinaceous fraction is introduced into the extruder barrel, preferably adjacent the extrusion die, for mixture and extrusion with the starch-bearing fraction. This yields an extruded feed having a starchy matrix with protein of high solubility carried by the matrix.

29 Claims, 1 Drawing Sheet

EXTRUDED HIGH SOLUBLE PROTEIN ANIMAL FEED AND METHOD OF PREPARING SAME

BACKGROUND OF THE INVENTION

1. Field of the Invention

The present invention is broadly concerned with an improved extruded animal feed having a protein content which is highly water soluble, to meet the needs of certain animals (e.g., shrimp and piglets) which require soluble protein. More particularly, the invention is concerned with such extruded feeds, and a method of preparation thereof which incorporates the advantages of extrusion cooking while at the same time maintaining the high level of soluble protein required.

2. Description of the Prior Art

Many types of animal feeds are processed by extrusion cooking. For example, virtually all dry chunk-type dog foods are extrusion processed, as are numerous other types of livestock feeds. In normal extrusion processing, the selected ingredients for the feed are mixed with water, preconditioned by agitation and heating, and then extruded. The latter involves passage through an elongated extruder barrel equipped with an internal, axially rotatable helically flighted screw and an endmost extrusion die. During passage through the barrel, the combined ingredients are subjected to increasing levels of temperature, pressure and shear. As the cooked product emerges from the extrusion die, it is conventionally cut to a desired particle size. Downstream of the extruder, feed products of this type are normally dried to enhance their storage and handling characteristics.

As a consequence of this normal extrusion processing, the starch fraction of the feed is normally highly or completely cooked (gelatinized), and the protein fraction thereof is likewise largely denatured and rendered insoluble. In the case of many animal feeds, this type of extrusion processing is a perfectly adequate answer, i.e., the intended animals can digest and obtain nutritional benefits from the processed feeds.

It has been discovered, however, that certain types of animals have difficulty in digesting denatured and insolubilized protein. For example, shrimp and piglets are known to require soluble protein for best growth and health. Therefore, conventionally extrusion processed feeds having substantially denatured protein fractions are not entirely suitable for these animals. Nevertheless, the ease of processing, storage and use attendant to extrusion processed feeds makes it desirable that feeds of this type be provided.

It is also known that certain types of vitamins are relatively heat-sensitive, and that exposure of these vitamins to high temperatures tends to degrade or deactivate them. For this reason, it is sometimes difficult to extrusion process vitamins as a part of feeds, while retaining full vitamin potency. The same problem obtains with respect to other heat-sensitive recipe ingredients, such as flavors, pigments and medicaments.

There is therefore a decided need in the art for an improved extrusion process which can yield extruded feeds having a high degree of protein solubility and vitamin potency coupled with the product integrity, storability and use characteristics of conventionally extruded feeds.

SUMMARY OF THE INVENTION

The present invention overcomes the problems outlined above and provides an improved production process for obtaining extruded feeds containing soluble protein. Broadly speaking, the process of the invention involves first providing starting ingredients for the feed product including starch-bearing and proteinaceous ingredients. These starting ingredients are split into respective fractions, one containing starch-bearing ingredient(s) and the other proteinaceous ingredient(s). The starch-bearing fraction is mixed with water and is passed into and through an extrusion cooker. The second proteinaceous fraction is introduced into the extruder and subjected to conditions which insure that the proteinaceous ingredients are not completely denatured and insolubilized. The two fractions are ultimately extruded together and thereby form the final feed product.

In one procedure, the starch-bearing fraction is first preconditioned and then fed into and through the extruder. The proteinaceous fraction is introduced into the extruder barrel and is thus not subjected to preconditioning. In the most preferred technique, the proteinaceous fraction is added to the barrel adjacent the extrusion die and therefore the proteinaceous ingredients thereof are subjected only to very moderate heating before being extruded with the starch-bearing fraction.

The final product of the invention is in the form of an extruded edible body including a matrix which comprises extrusion cooked starch-bearing grain. This matrix gives the product its desirable handling and use qualities and the starch content of the matrix is largely or completely gelatinized. The product further includes proteinaceous ingredient(s) carried by the matrix. These ingredient(s) exhibit a relatively high water solubility. In particular, it is desirable that the nitrogen solubility index of the extruded product is at least about 60% of the nitrogen solubility of the raw ingredients used in the fabrication of the extruded product.

DETAILED DESCRIPTION OF THE PREFERRED EMBODIMENTS

Figure 1:
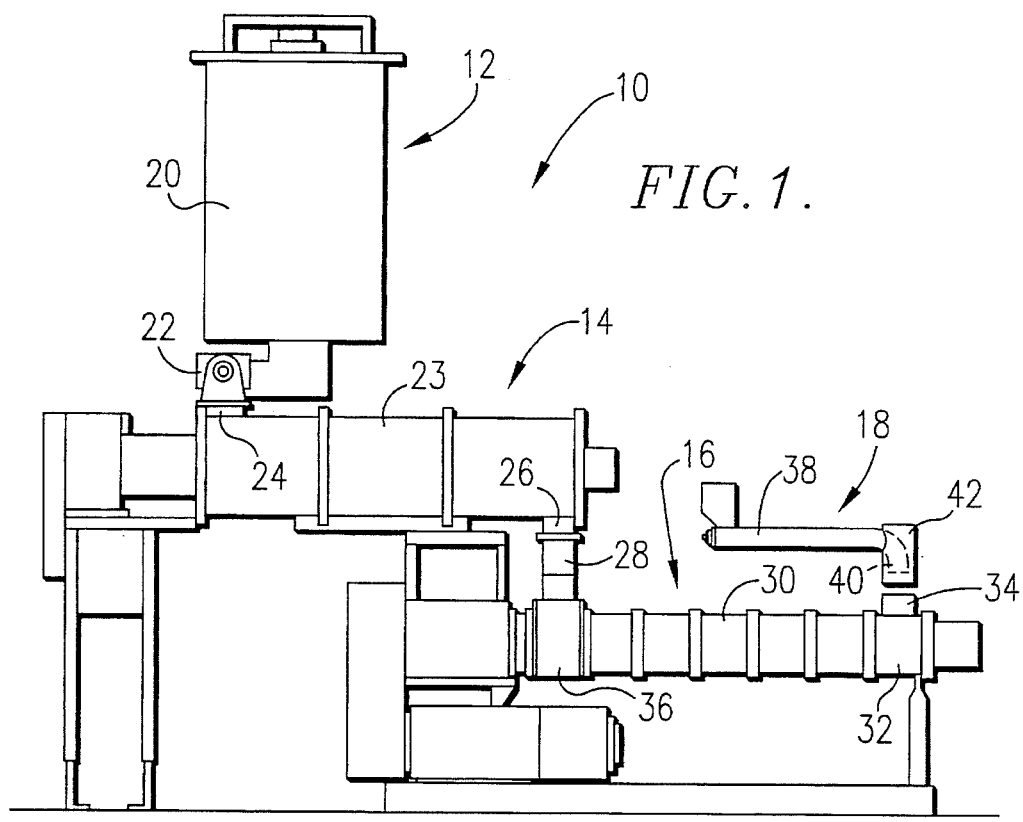
FIG. 1 is an essentially schematic side view of the preferred extruder apparatus used in the invention, wherein a separate feeder is provided for introduction of proteinaceous and vitamin ingredients into the barrel of the extruder downstream from the normal inlet.

Turning now to the drawings, and particularly FIG. 1, a preferred extruder apparatus 10 is illustrated. Broadly speaking, the apparatus 10 includes a bin and feeder assembly 12, preconditioner 14, extruder 16, and barrel metering screw assembly 18.

In more detail, the bin and feeder assembly 12 includes a conventional live bin 20 for receipt of incoming dry ingredients, as well as a powered feeder 22 for feeding of the ingredients from bin 20 at a controlled rate.

Preconditioner 14 is designed to receive incoming ingredients from assembly 12 and to moisturize and in some cases partially cook these ingredients prior to delivery thereof to the extruder 16. Preferably, the preconditioner is a Wenger DDC preconditioner of the type described in U.S. Pat. No. 4,752,139, which is incorporated by reference herein. The preconditioner includes an elongated, dual-chamber barrel 23 equipped with an inlet 24 as well as an outlet 26. As shown, the feeder 22 is coupled with inlet 24, whereas a down spout 28 is secured to outlet 26 and leads to extruder 16. The preconditioner 14 includes a pair of rotatable shafts each equipped with outwardly extending paddles or mixing elements. In addition, the preconditioner barrel 23 is normally provided with inlets (not shown) for introduction of steam, water or other liquids into the confines of barrel 23.

Extruder 16 as depicted is a Model X-165 single screw extruder commercialized by Wenger Manufacturing, Inc. of Sabetha, Kans. The extruder includes an elongated, segmented barrel 30, with an internal, elongated, helically flighted, axially rotatable powered extrusion screw (not shown) within barrel 30. In this case, barrel 30 is made up of seven interconnected heads. The sixth head 32 of barrel 30 is provided with an upstanding vent opening 34 which allows escape of steam or other gases from the barrel and introduction of ingredients into the barrel at this downstream location. In addition, the barrel 30 has the usual inlet head 36 operably coupled with down spout 28 for receiving material directly from preconditioner 14. As those skilled in the art will appreciate, the extruder 16 is also provided with an apertured die at the end of barrel 30 remote from inlet 36, as well as knife structure (not shown) for cutting the extrudate as it emerges from the die. Extruders of this type are also conventionally provided with jackets for introduction of heating or cooling medium to thereby afford a greater degree of temperature control; injection ports are also commonly provided along the length of barrel 30 to allow selective introduction of steam or other materials into the barrel.

Figure 2:
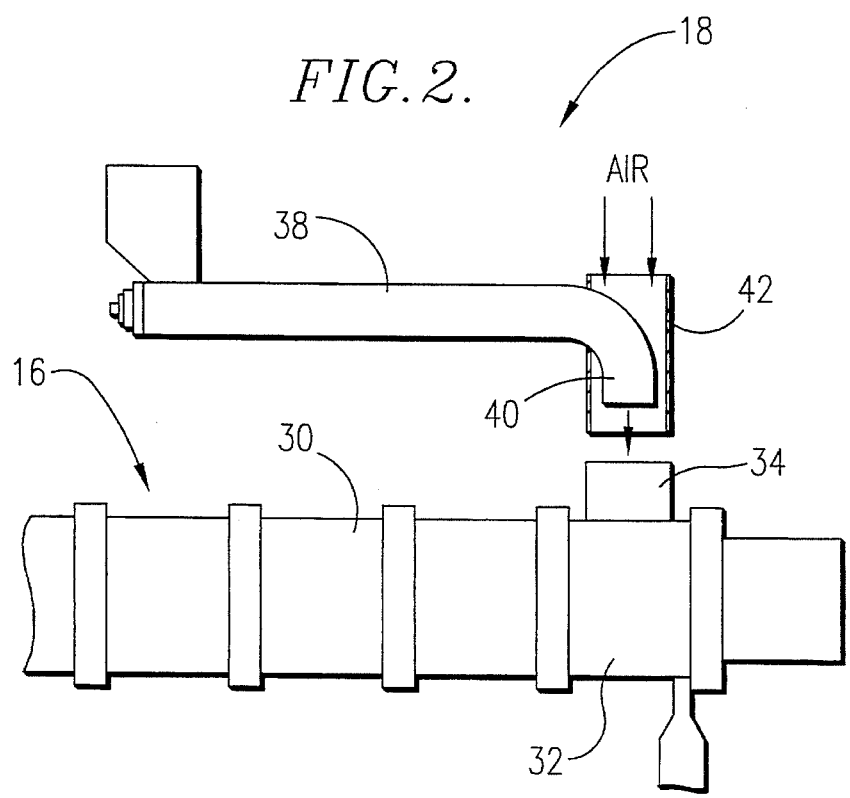
FIG. 2 is an enlarged, fragmentary essentially schematic view further illustrating the construction of the preferred barrel feeder apparatus.

Metering screw assembly 18 is positioned above opening 34 of head 32 and includes a conventional metering screw 38 equipped with a downwardly opening outlet 40 located directly above opening 34. The outlet 40 is surrounded by a tubular housing 42 (see FIG. 2) which assists in confining product delivered from metering screw 38 and directing this material into vent opening 34. Also, the hood 42 serves to augment an annular air flow downwardly through the hood; this inhibits excess steam from vent 34 from rising upwardly into outlet 40, which can cause undesired product caking.

In the practice of the present invention, a prime goal is to produce a proteinaceous feed product wherein the protein content of the feed has a high degree of solubility. At the same time, it is desired to have a substantially cooked starch fraction in the feed, both for palatability purposes and to provide product integrity. To this end, it has been found that highly acceptable feeds can be produced in an extrusion process wherein the starting recipe is split into two fractions, namely a starch fraction and a proteinaceous fraction. Usually, the starch fraction includes one or more grains, whereas the proteinaceous fraction may also include heat sensitive vitamins or the like.

In more detail, the process of the invention involves first providing starting ingredients for the desired feed product which would include starch-bearing and proteinaceous ingredients. As a general proposition, these initial ingredients can be themselves essentially conventional. For example, the starch-bearing ingredient(s) are most commonly grains such as corn, wheat, milo, rice, beets, barley and mixtures thereof. By the same token, the proteinaceous ingredient(s) can be taken from virtually any plant or animal protein source, e.g., meat, meat meal and fish meal. Generally, the overall recipe for the products of the invention are dictated primarily by the nutritional needs of the animal to be fed, and so long as such feeds contain both a starch-bearing and proteinaceous ingredient, then normally the dictates of the present invention are met.

In the next step, the starting ingredients are split into respective fractions. One fraction contains the starch-bearing ingredient(s), while the other fraction contains the proteinaceous ingredient(s). These respective fractions are then processed in different ways and are ultimately extruded together and dried to form the extruded feed of the invention.

In particular, it is preferred to mix the first starch-bearing fraction with water to form a dough-like material which is then passed into and through an elongated cooking extruder such as extruder 16. During passage through the extruder, the starch-bearing fraction is subjected to elevated temperature, pressure and shear for at least partial cooking of the starch-bearing fraction. On the other hand, the second, proteinaceous fraction is treated so as to avoid complete denaturization and insolubilization of the proteinaceous ingredient(s), thereby maintaining the desirable solubility thereof. However, such treatment of the second fraction does involve passage through at least a part of the extruder barrel so that both the first and second fractions are ultimately mixed and extruded together through the extrusion die to create the desired final product.

In preferred processing techniques, the first starch-bearing fraction is initially preconditioned before entering the extruder. Such preconditioning involves mixing of the dry ingredients with water with agitation and heating to normally effect partial cooking of the starch-bearing components. Preferably, preconditioning is carried out at a temperature of from about 150°–212° F., and more preferably from about _160°–185° F., with a residence time in the preconditioner of from about 20 seconds to 5 minutes, and more preferably from about 90–180 seconds. Sufficient water and/or steam is added to the dry ingredients during preconditioning to achieve a total moisture content in the material of from about 10–30% by weight wet basis (MCWB), and more preferably from about 18–22% by weight.

The preconditioned starch-bearing fraction is then directed to the inlet of the extruder, which can be essentially any conventional single or twin screw cooking extruder. During passage of the preconditioned material along and through the extruder, it is preferred that the material pass first through a cooking zone, then through venting and forming zones, with final extrusion through the endmost die. In such preferred processing, the starch-bearing fraction is heated to a maximum temperature of up to about 300° F. in the cooking zone, which is the maximum temperature that the starch-bearing fraction will experience in the extruder. In the venting zone, steam and/or volatiles are vented through the barrel opening, which also cools the material. At the venting zone, it is also preferred to add the second proteinaceous fraction for mixing with the starch-bearing fraction. In the forming zone downstream of the vent, the material passing through the extruder (i.e., both of the fractions) is usually densified (but may be slightly expanded) and ultimately extruded. However, maximum temperature conditions in the forming zone are preferably less than the maximum temperature conditions of the cooking zone. The residence time of the starch-bearing fraction in the cooking zone is from about 6–45 seconds, and more preferably from about 15–30 seconds. The residence time of the combined material passing through the forming zone is from about 2–16 seconds, and more preferably from about 4–12 seconds. Pressure conditions within the cooking zone are from about 15–800 psig and more preferably from about 200–600 psig; in the forming zone, such pressures are from about 15–1200 psig, and more preferably from about 50–250 psig.

It will be appreciated that the foregoing description of the most preferred processing technique is consistent with the drawing, i.e., introduction of the second proteinaceous fraction occurs at the vent opening. It is to be understood, however, that the invention is not so limited. That is to say, other points of introduction for the proteinaceous fraction can be used. Thus, such introduction may occur at various points along the length of the extruder barrel. Alternately, the introduction can occur at the normal inlet for the extruder, so that both fractions are subjected to the entire extrusion process; in this variant, however, the proteinaceous fraction is not subjected to preconditioning.

The final product is in the form of an extruded, edible body including a matrix comprising extrusion cooked starch-bearing grain and an extruded proteinaceous ingredient(s) different from the grain and carried by the matrix. The proteinaceous ingredient(s) are processed so as to avoid complete denaturation and insolubilization thereof. In particular, it is preferred that the nitrogen solubility index (NSI) of the product is at least about 60%, and more preferably at least about 85%, of the NSI of the raw ingredients used in fabrication of the food product.

The edible food product should have a total starch content of from about 8–50% by weight, and more preferably from about 10–30% by weight. This starch content should exhibit from about 40–100% gelatinization, and more preferably from about 60–100% gelatinization. Likewise, the product should have a protein content of from about 12–48% by weight, and more preferably from about 18–32% by weight. The moisture of the extruded body should be from about 16–35% by weight, and more preferably from about 20–30% by weight.

The food products hereof are normally densified and essentially non-cellular and non-expanded. This follows from the fact that die temperatures are normally well below 212° F., so that no significant expansion of the product occurs as it emerges from the die. However, if desired, the products may be slightly expanded. The products normally have a bulk density of from about of from about 24–45 pounds per cubic foot, and more preferably from about 26–38 pounds per cubic foot. The specific gravity of the products is normally from about 0.900–1.200.

EXAMPLES

The following examples illustrate preferred products in accordance with the invention, as well as methods of manufacture thereof. It should be understood, however, that these examples are provided by way of illustration only, and nothing therein should be taken as a limitation upon the overall scope of the invention.

Swine Feed

In this series of experiments, swine feeds in accordance with the present invention were produced. In each of these runs, the equipment illustrated in the drawing was employed. In particular, the equipment included a Model 16 DDC preconditioner (Configuration #109), as well as a 7-head Wenger X-165 single screw extruder equipped with an inlet at the 6th head thereof for introduction of protein and vitamin ingredients into the barrel. The extruder configuration included (where all parts are Wenger parts): heads 1-7, 65695-001, 65676-001, 65677-001, 65677-001, 65677-001, 65676-001, and 65689-001; internal sleeves in heads 2-7, 65691-001, 65674-001, 65674-001, 65674-001, 65777-001 and 65693-001; the rotating element parts of the screw from inlet to outlet, 65670-001, 65671-001, 65658-013, 65673-005, 65658-015, 65673-005, 65658-013, 656672-003, 65658-013, 65688-003F, 65688-003F, 65688-003F, 65688-003R, 65688-003R, 65688-003R, 65658-023, 65673-005B, 65658-015 and 65675-001. The die and knife configuration included: dies and adaptors, 65534-009AD, 65421-001BH, and ten inserts, 31360-229IN; knife blade #19430-007 (six blades used), and knife holder #19462-001.

In Runs 1 and 2, the starting ingredients were split into a grain/starch fraction and a protein/vitamin fraction. These fractions included the following ingredients:

| | Grain/Starch Fraction | |
|---|---|---|
| Ingredient | Pounds | % By Weight |
| Corn | 1531.98 | 66.04 |
| Soybean Meal | 539.81 | 23.27 |
| Mineral Premix | 7.89 | 0.34 |
| Soy Oil | 239.87 | 10.34 |

| | Protein/Vitamin Fraction | |
|---|---|---|
| Ingredient | Pounds | % By Weight |
| Whey | 799.78 | 47.63 |
| Dried Milk Powder | 799.78 | 47.63 |
| Limestone | 19.98 | 1.19 |
| Monocalcium Phosphate | 49.54 | 2.95 |
| Vitamin Premix | 10.07 | 6.60 |

In comparative Runs #3 and #4, the ingredients of the two fractions were combined to yield an overall recipe:

| | Combined Recipe | |
|---|---|---|
| Ingredient | Pounds | % By Weight |
| Corn | 153.21 | 37.92 |
| Soybean Meal | 53.98 | 13.36 |
| Mineral Premix | 0.81 | 0.20 |
| Whey | 80.00 | 19.80 |
| Dried Milk Powder | 80.00 | 19.80 |
| Limestone | 1.98 | 0.49 |
| Monocalcium Phosphate | 5.01 | 1.24 |
| Vitamin Premix | 0.08 | 0.02 |
| Soy Oil | 29.01 | 7.18 |

In carrying out the runs described below, the following general procedures were followed. In Runs #1 and #2, the dry ingredients of the grain/starch fraction were ground to a ¾₄" particle size and fed into the preconditioner; the soy oil was added as a liquid during preconditioning. After preconditioning in Run #1, the protein/vitamin fraction was added at the down spout leading from the preconditioner into the inlet of the extruder. In Run #2, the protein/vitamin fraction was added using the feeder arrangement at head #6 of the extruder barrel.

In comparative Runs #3 and #4, all of the ingredients except for the soy oil were ground to a ¾₄" particle size and were fed into the preconditioner in the usual fashion. The soy oil was added to the preconditioner during preconditioning of the starting ingredients. After preconditioning was completed, the entire recipe was fed into and through the extruder, with no down spout or barrel additions. After extrusion, the products from the respective Runs were conventionally dried.

The following table sets forth the results of this series of production runs.

Wenger parts 65534-009AD, 65421-003BH, 31350-779IN, and two die inserts with ⅜" holes were employed. In Runs #6–8, the die/adaptor arrangement included parts 65534-009AD, 65421-003BH and two inserts, 31450-959IN. In Runs #6–8, the die/adaptor arrangement was made up of

TABLE 1

|  |  | Run #1 | Run #2 | Run #3 | Run #4 |
|---|---|---|---|---|---|
| DRY RECIPE INFORMATION |  |  |  |  |  |
| Dry Recipe Rate | kg/hr. | 400 | 400 | 717 | 717 |
| Feed Screw Speed | rpm | 21 | 21 | 38 | 81 |
| PRECONDITIONING INFORMATION |  |  |  |  |  |
| Steam Flow to Preconditioner | kg/hr. | 61 | 62 | 62 | 136 |
| Water Flow to Preconditioner | kg/hr. | 40 | 40 | 40 | 85 |
| Preconditioner Additive 1 Rate | kg/hr. | 44 | 44 | 43 | 90 |
| Preconditioner Discharge Temp. | °C. | 78 | 82 | 77 | 86 |
| Moisture Entering Extruder | % wb | 20.94 | 21.73 | 18.02 | 17.08 |
| EXTRUSION INFORMATION |  |  |  |  |  |
| Extruder Shaft Speed | rpm | 358 | 358 | 358 | 416 |
| Extruder Motor Load | % | 35 | 35 | 29 | 43 |
| Water Flow to Extruder (barrel injection) | kg/hr. | 8 | 8 | 7 | 15 |
| Control/Temperature 1st Head | °c. | — | — | 60 | 72 |
| Control/Temperature 2nd Head | °C. | 57 | 65 | 62 | 79 |
| Control/Temperature 3rd Head | °C. | 58 | 64 | 63 | 85 |
| Control/Temperature 4th Head | °C. | 70 | 66 | 72 | 89 |
| Control/Temperature 5th Head | °C. | 44 | 41 | 47 | 70 |
| Control/Temperature 6th Head | °C. | 63 | 66 | 63 | 70 |
| MOISTURE INFORMATION |  |  |  |  |  |
| Preconditioner Discharge | % wb | 18.02 | 17.08 | 20.94 | 21.73 |
| Extruder Discharge | % wb | 19.46 | 16.56 | 16.51 | 15.77 |
| Dryer Discharge | % wb | 8.72 | 8.21 | 10.31 | 6.25 |

The combined recipe as well as the extrudates obtained from Runs #1–3 were tested for percent cook, Kjeldahl protein, crude fiber, ash, nitrogen solubility index (NSI), crude fat by acid hydrolysis, available lysine and total lysine. These results are set forth in Table 2.

TABLE 2

| Test | Combined Recipe (raw) | Run #1 Extrudate | Run #2 Extrudate | Run #3 Extrudate |
|---|---|---|---|---|
| Cook | 22.1% | 58.0% | 62.3% | 50.9% |
| Protein | 17.46% | 18.47% | 19.18% | 18.87% |
| Crude Fiber | 1.8% | 1.4% | 1.4% | 1.7% |
| Ash | 5.59% | 5.83% | 6.11% | 5.67% |
| NSI | 48.9% | 36.7% | 38.8% | 32.5% |
| Crude Fat | 9.51% | 9.65% | 9.63% | 10.02% |
| Available Lysine | 0.72/0.77% | 0.78% | 0.67% | 0.71% |
| Total Lysine | 0.91/1.0% | 0.78% | 0.67% | 0.71% |

The foregoing results demonstrate the effectiveness of the invention in achieving high cook values while preserving the solubility of the protein fraction.

Shrimp Feed

In Runs #6–8 of this series, the same basic equipment was used, again as depicted in FIG. 1. The same DDC preconditioner and particular configuration were used as compared with the swine feed tests. In addition, the X-165 extruder configuration was the same, except that a different die/adaptor arrangement was used. In the case of Run #5, parts 65534-009AD, 65421-003BH and ten inserts, 31450-959IN.

In the case of Run #5, a Wenger F-155 former extruder was employed in lieu of the X-165. The former extruder had four heads, a #31374-001 die spacer, #31328-069 die, #19462-073 knife holder, three #19513-007 knife blades, and with 11 die inserts (fifteen 2 mm holes per insert).

In Runs #5–7, two separate ingredient fractions were used, namely a grain/starch fraction and a protein/vitamin fraction. These fractions had the following ingredients:

| Grain/Starch Fraction | | |
|---|---|---|
| Ingredient | Pounds | % By Weight |
| Wheat Middlings | 1133.69 | 48.90 |
| Corn | 1049.76 | 45.28 |
| Beet Pulp | 134.93 | 5.82 |

| Protein/Vitamin Fraction | | |
|---|---|---|
| Ingredient | Pounds | % By Weight |
| Calcium Carbonate | 185.93 | 27.31 |
| Salt | 59.98 | 8.81 |
| Fish Meal | 359.88 | 52.86 |
| Fish Oil | 74.96 | 11.01 |

In Run #8, a combined recipe was employed having the following constituents:

| | Combined Recipe | |
|---|---|---|
| Ingredient | Pounds | % By Weight |
| Wheat Middlings | 313 | 31.3 |
| Corn | 285 | 28.5 |
| Beet Pulp | 37 | 3.7 |
| Calcium Carbonate | 100 | 10.0 |
| Salt | 32 | 3.2 |
| Fish Meal | 193 | 19.3 |
| Fish Oil | 40 | 4.0 |

In carrying out this set of experiments, the following general procedures were followed. In Run #5, the grain/starch fraction was placed in the live bin and through the preconditioner for passage into and through the former extruder. The protein/vitamin fraction was introduced into the extruder barrel at the normal inlet. In Run #6, the grain/starch fraction was preconditioned and the protein/vitamin fraction was added at the 6th head vent opening of the extruder barrel. Run #7 was identical with Run #6 except that the protein/vitamin fraction was added to the down spout from the preconditioner to the extruder barrel. In Run #8, the combined recipe was passed through the live bin and preconditioner, except for the fish oil which was added as a liquid to the preconditioner.

The extrudates from these runs were dried in a multiple-pass dryer using air temperatures of about 90° C. with two pass retention times of from 3.9–6.9 minutes.

The following table sets forth the conditions for this set of runs.

I claim:

1. A process for the production of a feed product containing a soluble protein fraction, said process comprising the steps of:

providing starting ingredients for said feed product including starch-bearing and proteinaceous ingredients;

splitting said starting ingredients into respective fractions, one fraction containing said starch-bearing ingredient, and another fraction containing said proteinaceous ingredient;

mixing said one fraction with water and passing the one fraction into and through an elongated cooking extruder having a barrel equipped with an inlet and a spaced, endmost extrusion die, and, during such passage, subjecting the one fraction to elevated temperature, pressure and shear for at least partial cooking of said starch-bearing ingredient; and introducing said other fraction into said barrel at a point between said inlet and extrusion die for mixing thereof with said one fraction, and, during passage of the other fraction from said point to and through said extrusion die, subjecting the other fraction to conditions of temperature, pressure and shear insufficient to completely denature and insolubilize said proteinaceous ingredient, said one and said other fraction being simultaneously extruded through said extrusion die, the residence time of said one fraction within said extruder being greater than the residence time of said other fraction in said extruder.

2. The process of claim 1, said one fraction comprising starch-bearing grain.

TABLE 3

| | | Run #5 | Run #6 | Run #7 | Run #8 |
|---|---|---|---|---|---|
| DRY RECIPE INFORMATION | | | | | |
| Dry Recipe Moisture | % wb | 8.73 | 8.73 | 8.73 | 8.73 |
| Feed Screw Speed | rpm | 34 | 38 | 35 | 52 |
| PRECONDITIONING INFORMATION | | | | | |
| Preconditioner Speed | rpm | — | — | 250 | 250 |
| Steam Flow to Preconditioner | kg/hr. | 42 | 52 | 52 | 59 |
| Water Flow to Preconditioner | kg/hr. | 68 | 110 | 110 | 117 |
| Preconditioner Additive 1 Rate | kg/hr. | 37 | 37 | 37 | 38 |
| Preconditioner Discharge Temp. | °C. | 51 | 69 | 73 | 61 |
| Moisture Entering Extruder | % wb | 22.93 | 27.48 | 25.53 | 24.27 |
| EXTRUSION INFORMATION | | | | | |
| Extruder Shaft Speed | rpm | 417 | 417 | 417 | 417 |
| Extruder Motor Load | % | 27 | 32 | 36 | 34 |
| Water Flow to Extruder (barrel injection) | kg/hr. | 16 | 5 | 0 | 0 |
| Control/Temperature 2nd Head | °C. | 52 | 60 | 64 | 57 |
| Control/Temperature 3rd Head | °C. | 59 | 68 | 66 | 66 |
| Control/Temperature 4th Head | °C. | 65 | 72 | 67 | 73 |
| Control/Temperature 5th Head | °C. | 77 | 87 | 76 | 78 |
| Control/Temperature 6th Head | °C. | 88 | 84 | 49 | 76 |
| Control/Temperature 7th Head | °C. | 77 | 92 | 69 | 64 |
| Head/Pressure | kPa | 7/740 | 7/1870 | 7/2690 | 7/2150 |
| Knife Drive Speed | rpm | — | — | — | 1224 |
| MOISTURE INFORMATION | | | | | |
| Dry Recipe | % wb | 8.73 | 8.73 | 8.73 | 8.73 |
| Preconditioner Discharge | % wb | 22.93 | 27.48 | 25.53 | 24.27 |
| Extruder Discharge | % wb | 26.87 | 23.81 | 21.48 | 23.65 |
| Former Discharge | % wb | 20.67 | — | — | — |
| Dryer Discharge | % wb | 4.8 | 6.89 | 7.44 | 9.95 |

3. The process of claim 2, said grain being selected from the group consisting of corn, wheat, milo, rice, beets, barley and mixtures thereof.

4. The process of claim 1, said other fraction including a proteinaceous ingredient selected from the group consisting of animal and plant protein sources.

5. The process of claim 4, said proteinaceous ingredient being selected from the group consisting of meat, meat meal and fish meal.

6. The process of claim 1, including the step of mixing said one fraction with water, and subjecting the moisturized one fraction to a preconditioning step prior to introduction thereof into said extruder.

7. The process of claim 6, said preconditioning comprising the steps of subjecting the moisturized one fraction to agitation and a temperature of from about 150° 212° F. for a period of from about 20 seconds to 5 minutes.

8. The process of claim 1, including the step of heating said one fraction in said extruder barrel to a maximum temperature of about 300° F.

9. The process of claim 1, including the step of sequentially advancing said one fraction along the length of said barrel first through a cooking zone, then through a venting zone and a forming zone, and finally through said die, said one fraction being heated to a maximum temperature of up to about 300° F. in said cooking zone, with the one fraction reaching the maximum temperature which it will experience in said extruder in said cooking zone prior to entering said venting zone, said other fraction being added at said venting zone, both of said fractions being subjected to a pressure in the range of from about 15–1200 psig in said forming zone.

10. The process of claim 9, the residence time of said fraction in said cooking zone being from about 6–45 seconds, and the residence time of both of said fractions in said forming zone being from about 2–16 seconds.

11. The process of claim 1, including the step of adding sufficient water to said one fraction to obtain a total moisture content of from about 10–30% by weight.

12. The feed product made by the method of claim 1.

13. A process for the production of a feed product containing a soluble protein fraction, said process comprising the steps of:

providing starting ingredients for said feed product including starch-bearing and proteinaceous ingredients;

splitting said starting ingredients into respective fractions, one fraction containing said starch-bearing ingredient, and another fraction containing said proteinaceous ingredient;

mixing said one fraction with water and subjecting the one fraction to preconditioning with agitation and heating, and thereafter passing the preconditioned one fraction into and through an elongated cooking extruder having a barrel equipped with an inlet and a spaced, endmost extrusion die, and, during such passage, subjecting the one fraction to elevated temperature, pressure and shear for at least partial cooking of said starch-bearing ingredient; and introducing said other fraction into said barrel without preconditioning of the other fraction, and, during passage of the other fraction from the point of introduction thereof into said barrel to and through said extrusion die, subjecting the other fraction to conditions of temperature, pressure and shear insufficient to completely denature and insolubilize said proteinaceous ingredient, said one and said other fraction being simultaneously extruded through said extrusion die, the residence time of said one fraction within said extruder being greater than the residence time of said other fraction in said extruder.

14. The process of claim 13, said one fraction comprising starch-bearing grain.

15. The process of claim 14, said grain being selected from the group consisting of corn, wheat, milo, rice, beets, barley and mixtures thereof.

16. The process of claim 13, said other fraction including a proteinaceous ingredient selected from the group consisting of animal and plant protein sources.

17. The process of claim 16, said proteinaceous ingredient being selected from the group consisting of meat, meat meal and fish meal.

18. The process of claim 13, including the step of sequentially advancing said one fraction along the length of said barrel first through a cooking zone, then through a venting zone and a forming zone, and finally through said die, said one fraction being heated to a maximum temperature of up to about 300° F. in said cooking zone, with the one fraction reaching the maximum temperature which it will experience in said extruder in said cooking zone prior to entering said venting zone, said other fraction being added at said venting zone, both of said fractions being subjected to a pressure in the range of from about 15–1200 psig in said forming zone.

19. The process of claim 18, the residence time of said fraction in said cooking zone being from about 15–30 seconds, and the residence time of both of said fractions in said forming zone being from about 4–12 seconds.

20. The process of claim 13, including the step of adding sufficient water to said one fraction to obtain a total moisture content of from about 20–30% by weight.

21. The process of claim 13, including the step of introducing said other fraction into said barrel at a point between said inlet and said extrusion die.

22. The feed product made by the method of claim 13.

23. A feed product containing a soluble protein fraction comprising an extruded, edible body including a matrix comprising extrusion cooked starch-bearing grain and an extruded proteinaceous ingredient different from said grain and carried by said matrix, said body having a moisture content of from about 16–35% by weight, the nitrogen solubility index of said product being at least about 60% of the nitrogen solubility index of the raw ingredients used in the fabrication of the product, the proteinaceous ingredient in said body being incompletely denatured and incompletely in-solubilized, the starch content of said body being from about 40–100%.

24. The product of claim 23, said grain being selected from the group consisting of corn, milo, rice, beets, barley and mixtures thereof.

25. The product of claim 23, said proteinaceous ingredients being selected from the group consisting of animal and plant protein sources.

26. The product of claim 25, said proteinaceous ingredient being selected from the group consisting of meat, meat meal and fish meal.

27. The product of claim 23, said body having a starch content of from about 8–50% by weight.

28. The product of claim 23, said body having a protein content of from about 12–48% by weight.

29. The product of claim 23, including vitamins and minerals carried by said matrix.

* * * * *